Aug. 20, 1935.  O. WITTEL  2,011,602
MOTION PICTURE PULL-DOWN
Filed Aug. 4, 1934
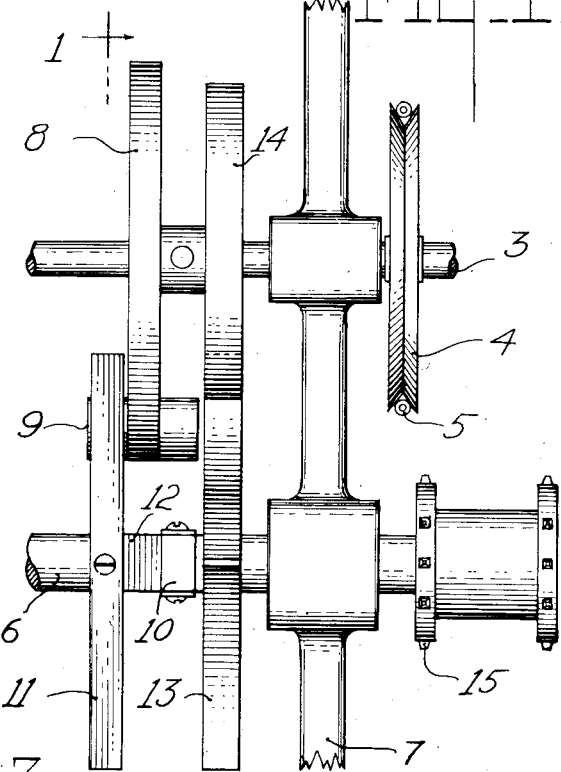
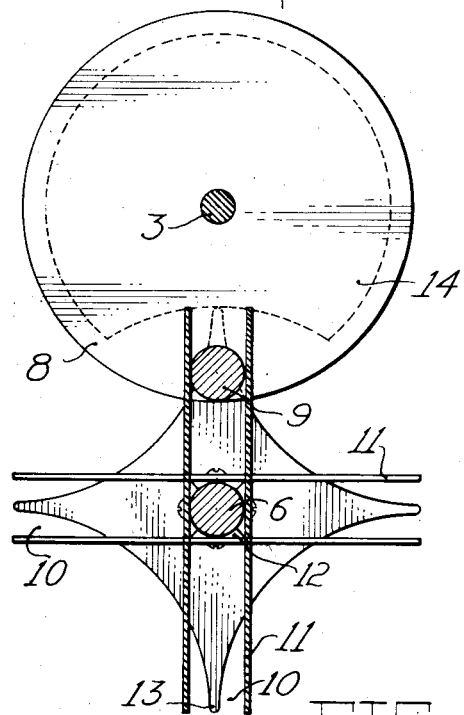
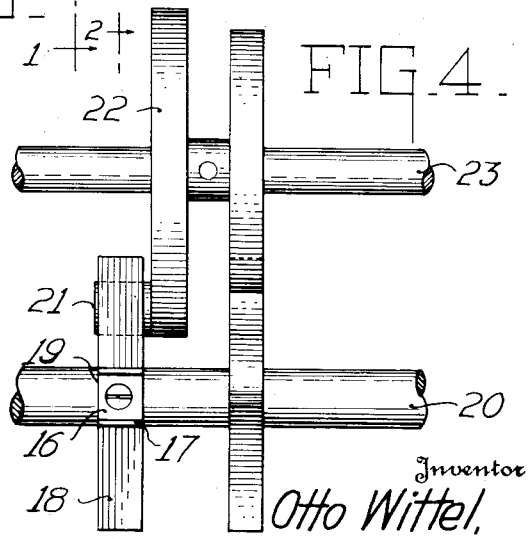
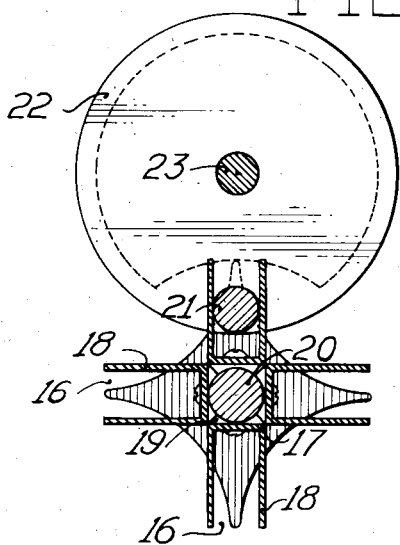
Inventor
Otto Wittel,
By
Attorneys Patented Aug. 20, 1935

2,011,602

UNITED STATES PATENT OFFICE 2,011,602

MOTION PICTURE PULL-DOWN

Otto Wittel, Rochester, N. Y., assignor to Eastman Kodak Company, Rochester, N. Y., a corporation of New York Application August 4, 1934, Serial No. 738,527

10 Claims. (Cl. 74—436)

This invention relates to photography and more particularly to the intermittent feeding mechanism for the film in a moving picture projector.

At the present time the major part of intermittent film feeding mechanisms for cinematographs consist either of the Geneva gear type mechanism or the claw pull down type of mechanism. To those persons skilled in the art, it is well known that each of these two types of intermittent film feeding mechanisms have advantages over the other.

The Geneva type of mechanism has the advantage of being accurate and quiet in its operation, but is undesirable because of the extreme accuracy that is required in the manufacture and assembly of its several parts for satisfactory operation, and also because of the short duration of satisfactory performance it gives due to wearing out of the driving pin and slot connections causing the film to move inaccurately and unsteady and the mechanism to become noisy.

The claw type pull down mechanism has the advantage of ease in manufacture and assembly and also the elimination of parts which are moving in contact with one another thereby causing short life due to frictional wear, but this type of film feeding mechanism is rather noisy and inaccurate in its operation.

With the advent of sound reproduction in synchronization with moving picture projection all forms of noise were found to be very objectionable because they interfered with the sound reproduction. The greatest source of noise in the moving picture projector was found to come from the intermittent film feeding mechanism, and this objection was most noticeable in instances where the claw type of pull down mechanism was used.

Therefore, in view of the above facts, one object of this invention is to provide an intermittent film feeding mechanism for the film in a moving picture projector, which also reproduces sound, that is quiet and won't interfere with the sound reproduction.

Another object, is an intermittent film feeding mechanism for film in a cinematograph the contact parts of which are resistant to wear and misalignment.

A further object of the invention is to provide a new and improved intermittent film feeding mechanism which is accurate in operation and at the same time simple to manufacture and assemble.

In order to produce these desired results, a mechanism is employed which embodies the principles of the Geneva movement. A star wheel is secured to the intermittent shaft, slots are formed, entirely apart from the star, on the intermittent shaft, by springs mounted on said shaft in pairs, said slots accommodating an enlarged driving pin which extends through a driving disc on the continuously rotated shaft. A sector wheel is mounted on the driving shaft to co-operate with the star wheel, the co-operation of the two acting to bring the spring slots into the path of the driving pin once for each revolution of the driving shaft and thereby produce a quarter turn to the driven shaft. The curved surface of the star wheel acts with the periphery of the sector wheel for holding the driven shaft stationary until the next spring slot is to be brought into the path of the driving pin.

A practical embodiment and a modified form of this invention are represented in the accompanying drawing forming a part of this specification, in which similar characters of references indicate corresponding parts in the related views.

Figure 1 is a side elevation of the intermittent feeding mechanism showing the driving means and the intermittent sprocket.

Figure 2 is a sectional end elevation of the intermittent film feeding mechanism, on line 1—1 of Figure 1, showing the construction of the resilient slots and pin connection.

Figure 3 is a sectional end elevation of Figure 4 on line 2—2 showing the modified form of resilient slots.

Figure 4 is a side elevation of a modified form of intermittent film feeding mechanism omitting all auxiliary parts.

The device consists of a shaft 3 which is rotated continuously by any suitable driving means shown in the drawing by pulley 4 and the belt 5, said belt being connected to any driving means such as a synchronous motor (not shown). Any convenient form of frame, as shown by 7, journals and holds the driving shaft 3 and the intermittently driven shaft 6 in a fixed relation to one another. On the driving shaft 3 there is secured a driving disc 8 having a driving pin 9 extending therethrough an equal distance on each side of the disc 8 thereby forming two working surfaces for engaging at regular intervals the resilient walled slots 10 on the intermittent or driven shaft.

These resilient walled slots 10 form one of the novel features of this invention and are formed by mounting flat springs 11 in pairs in parallel relation on a squared portion 12 of the intermittent shaft 6 so as to form the resilient walls defining slots 10 which are periodically engaged by the driving pin 9. As shown in Figure 1 and Figure 2, the preferred construction provides for four of these resilient walls, between pairs of which are slots 10 formed by four flat springs 11 mounted on a squared portion 12 of the intermittent shaft 6. Each pair of springs is mounted on the sides of the squared portion 12, of the intermittent shaft 6, so that four resilient walled slots 10 are formed which are in quadrant relation to one another, and these pairs of springs are spaced apart on the shaft 6, a suitable distance, so that the two resilient walled slots 10 formed by each pair of springs will engage the driving pin 9 alternately on opposite sides of the driving disc 8 for each revolution of the driving shaft 3.

A four pointed star wheel 13 is mounted on the intermittent shaft 6 in definite relation to the resilient walled slots 10 on the same shaft, so that on engagement with a sector wheel 14, secured to the continuous shaft 3, the resilient walled slots 10 are brought into the path of the driving pin 9, and the intermittent shaft 6 is rotated through a quarter of a revolution for each complete revolution of the driving shaft 3. The relation of parts as described gives a four to one ratio between the driving shaft 3 and the intermittent shaft 6, or for each revolution of the driving shaft 3 the intermittent shaft 6 is given quarter turn which is transmitted to the sprocket 15 for driving the film intermittently.

In Figure 3 and Figure 4, a modified form of providing the resilient walled slots and locating the same is shown. In Figures 3 and 4 the resilient walled slots 16 are formed by mounting four separate channel sections 17, having resilient flanges 18, on adjacent sides of a squared portion 19 of the intermittent shaft 20. In this instance the four resilient walled slots 16 are in quadrant relation but they are placed back to back on the shaft 20 so that a driving pin 21, mounted on only one side of the driving disc 22 on the continuous driving shaft 23, is engaged by all four resilient walled slots 16 at regular intervals in which case there is only one driving pin surface and consequently twice the frictional wear as in the preferred form of the mechanism shown above.

These two forms of the invention are shown mainly to point out different ways in which the resilient walled slots may be mounted and operated without departing from the novel idea of this invention, and obviously other ways will occur to one skilled in the art.

The operation of this device is as follows: a driving pin mounted in a fixed position on a continuously rotated driving shaft periodically engages resilient walled slots mounted on the intermittent shaft for intermittently rotating a film sprocket, said slots and driving pin being brought into engagement at regular predetermined intervals by means of a star wheel, mounted on the intermittent shaft, co-operating with a sector wheel mounted on the continuously rotated driving shaft.

The use of a driving pin having two working surfaces and resilient walled slots for engaging these working surfaces alternately is advantageous, because it cuts the frictional contact for any one working surface of the driving pin in half and thereby doubles the life of the mechanism in regards to misalignment of parts due to frictional wear. It is obvious, to those skilled in the art, that the use of resilient walled slots in this type of intermittent film feeding mechanism will reduce the wear between the contacting surfaces and will eliminate a great amount of the noise, because the resilience of the wall of the slot will absorb some of the impact accompanying the engagement of the driving pin and slot. A further advantage of this invention over former similar devices is found in the fact that the use of springs mounted as shown for forming the driving slots, permits the use of a larger slot and larger driving pin than could be used heretofore, thereby increasing the strength and wearing qualities of the pin to overcome difficulties which arise in other intermittent film feeding mechanisms operating on the pin and slot principle.

Having thus described my invention, what I declare is new and desire to secure by Letters Patent of the United States is:

1. A star wheel for intermittent film feeding mechanisms including a continuously driven driving pin, said star wheel including slots for the reception of said pin, the sides of said slots being defined by parallel resilient spring arms.

2. In an intermittent feeding mechanism of the Geneva type the combination of, a driving shaft, a pin mounted on said shaft, a shaft to be rotated intermittently, resilient means on the latter shaft for engaging the pin on the driving shaft, and co-operating means on the two shafts for bringing the pin and resilient means into engagement at regular intervals.

3. In an intermittent feeding mechanism of the Geneva type the combination of, a driving shaft, a driving pin having two working surfaces mounted on said shaft, a shaft to be rotated intermittently, resilient means on the intermittent shaft for alternately engaging the driving pin on opposite working surfaces, and co-operating means on the two shafts for bringing the pin and resilient means into engagement at regular intervals.

4. An intermittent film feeding mechanism, comprising a continuously rotated shaft, a shaft to be rotated intermittently, a driving disc on the former shaft, a driving pin extending through said driving disc, resilient means mounted on the intermittent shaft forming slots for engaging said driving pin, and means operating between the two shafts for bringing one into the path of the other.

5. An intermittent film feeding mechanism, comprising a continuously rotated shaft, a shaft to be rotated intermittently, a driving disc secured to said driving shaft, a pin extending through said driving disc providing two working surfaces, one on either side of the driving disc, resilient bearing surfaces forming slots on the intermittent shaft for alternately engaging the two working surfaces of said driving pin, and co-operating means on the two shafts for bringing one into the path of the other at regular intervals.

6. An intermittent film feeding mechanism, comprising a continuously rotated shaft, a shaft to be rotated intermittently, a driving disc on the former shaft, a driving pin through said disc providing two working surfaces, one on either side of said disc, four springs mounted on the intermittent shaft in pairs forming four slots having resilient bearing surfaces in quadrant relation, each pair of springs spaced apart axially along the intermittent shaft to alternately engage opposite sides of the driving pin, and means on the two shafts co-operating to bring the driving pin and resilient bearing surfaces into engagement at regular intervals.

7. An intermittent film feeding mechanism, comprising a continuously rotated shaft, a shaft to be rotated intermittently, a driving disc on the former shaft, a driving pin through said driving disc and extending both sides thereof, springs mounted in pairs on the other shaft to form slots having resilient bearing surfaces for engaging the driving pin, said pairs of springs mounted apart axially along the intermittent shaft so that each succeeding pair of springs engages the driving pin on opposite sides of the driving disc, a sector wheel on the continuous shaft, and a star wheel on the intermittent shaft adapted to engage said sector wheel for bringing the slots into and out of the path of the driving pin at regular predetermined intervals.

8. An intermittent film feeding mechanism, comprising a continuously rotated shaft, a shaft to be rotated intermittently, a driving disc on the former shaft, a driving pin on said driving disc, resilient means mounted on the intermittent shaft forming slots having resilient bearing surfaces, a sector wheel secured to the continuously driven shaft, and a star wheel mounted on the intermittent shaft adapted to be engaged by the sector wheel for bringing the slots into the path of the driving pin at regular intervals.

9. An intermittent film feeding mechanism, comprising a continuously rotated shaft, a shaft to be rotated intermittently, a driving disc on the former shaft, a driving pin through said driving disc, resilient means mounted on the intermittent shaft forming slots having resilient bearing surfaces, said resilient means displaced so that the slots formed alternately engage the driving pin on opposite sides of the driving disc, a star wheel secured to the intermittent shaft, and a sector wheel mounted on the continuously rotated shaft adapted to engage the star wheel at regular intervals for bringing the slots into the path of the driving disc.

10. An intermittent film feeding mechanism, comprising a continuously rotated shaft, a shaft to be rotated intermittently, a driving disc on the former shaft, a driving pin through said driving disc and extending an equal distance on each side of said disc, four springs mounted in pairs on a squared portion of the intermittent shaft forming four slots having resilient bearing surfaces for engaging the driving pin, each pair of springs being spaced apart axially along the intermittent shaft and arranged perpendicular to each other giving four slots in quadrant relation for engaging the driving pin alternately on opposite sides of the working disc, a sector wheel secured to the continuous shaft, and a four pointed star mounted on the intermittent shaft adapted to be engaged by said sector wheel for bringing the slots into the path of the driving pin once for every revolution of the continuous shaft thereby giving the intermittent shaft a quarter turn for each complete revolution of the driving shaft.

OTTO WITTEL.